(12) United States Patent
Battle et al.

(10) Patent No.: US 11,061,681 B2
(45) Date of Patent: Jul. 13, 2021

(54) INSTRUCTION STREAMING USING COPY SELECT VECTOR

(71) Applicant: International Business Machines Corporation, Armonk, NY (US)

(72) Inventors: Steven J. Battle, Austin, TX (US); Joshua W. Bowman, Austin, TX (US); Hung Q. Le, Austin, TX (US); Dung Q Nguyen, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/521,866

(22) Filed: Jul. 25, 2019

(65) Prior Publication Data

US 2021/0026643 A1   Jan. 28, 2021

(51) Int. Cl.
  *G06F 9/38* (2018.01)
(52) U.S. Cl.
  CPC .......... *G06F 9/3851* (2013.01); *G06F 9/3842* (2013.01); *G06F 9/3867* (2013.01)
(58) Field of Classification Search
  None
  See application file for complete search history.

(56) References Cited

U.S. PATENT DOCUMENTS

| | | | |
|---|---|---|---|
| 5,519,841 A | 5/1996 | Sager et al. | |
| 6,389,446 B1 * | 5/2002 | Torii | G06F 8/45 718/100 |
| 6,760,835 B1 * | 7/2004 | Yu | G06F 9/3804 712/205 |
| 7,711,934 B2 * | 5/2010 | Kishore | G06F 9/384 712/233 |
| 7,873,776 B2 * | 1/2011 | Hetherington | G06F 9/3824 711/5 |
| 8,417,923 B2 * | 4/2013 | Williams | G06F 9/30054 712/227 |
| 8,514,232 B2 | 8/2013 | Mejdrich et al. | |
| 9,639,371 B2 | 5/2017 | Yazdani | |

(Continued)

OTHER PUBLICATIONS

Gordon et al., "Exploiting Coarse-Grained Task, Data, and Pipeline Parallism in Stream Programs", ASPLOS'06, Oct. 21-25, 2006, San Jose, CA, USA, 12 pages.

*Primary Examiner* — Michael Sun
(74) *Attorney, Agent, or Firm* — Scully, Scott, Murphy & Presser, P.C.

(57) ABSTRACT

A method, system, and/or processor for processing data is disclosed that includes processing a parent stream; detecting a branch instruction in the parent stream; activating an additional child stream; setting a copy select vector of the child stream to be the same as the copy select vector of the parent stream; dispatching instructions for the parent stream and the additional child stream, and executing the parent stream and the additional child stream on different execution slices. In an aspect, the method further includes setting the copy select bits in the copy select vector for the child stream to equal the copy select bits in the copy select vector for the parent stream. A first parent mapper copy in an embodiment is associated and used in connection with executing the parent stream and a second different child mapper copy is associated and used in connection with executing the additional child stream.

20 Claims, 11 Drawing Sheets

(56) References Cited

U.S. PATENT DOCUMENTS

| | | | |
|---|---|---|---|
| 9,672,019 B2 | 6/2017 | Sager et al. | |
| 2011/0167416 A1 | 7/2011 | Sager et al. | |
| 2011/0283095 A1* | 11/2011 | Hall | G06F 9/3009 |
| | | | 712/228 |
| 2011/0320719 A1 | 12/2011 | Mejdrich et al. | |
| 2013/0191825 A1* | 7/2013 | Muff | G06F 9/30189 |
| | | | 718/1 |
| 2014/0215187 A1 | 7/2014 | Yazdani | |
| 2015/0006862 A1* | 1/2015 | Gschwind | G06F 9/30145 |
| | | | 712/226 |
| 2018/0074862 A1 | 3/2018 | Branson et al. | |
| 2019/0347125 A1* | 11/2019 | Sankaran | G06F 9/3863 |
| 2020/0042319 A1* | 2/2020 | Lloyd | G06F 9/3836 |
| 2020/0133679 A1* | 4/2020 | Brandt | G06F 9/522 |

\* cited by examiner

INSTRUCTION STREAMING USING COPY SELECT VECTOR

BACKGROUND OF INVENTION

The present invention generally relates to data processing systems, processors, and more specifically to out-of-order execution processors and simultaneous multi-threading processors.

Processors currently used in data processing systems process more than one instruction at a time, and often process those instructions out-of-order. In modern computer architecture, there are several known ways to design a computer adapted to perform more than one instruction at a time, or at least in the same time frame. For example, one design to improve throughput includes multiple execution slices within a processor core to process multiple instruction threads at the same time, with the threads sharing certain resources of the processor core. An execution slice may be a pipeline or pipeline-like structure where multiple data processing hardware units are connected in series to process multiple instructions in a single processing cycle. Pipelining involves processing instructions in stages, so that the pipelined stages may process a number of instructions concurrently. Multiple execution slices may be used as part of simultaneous multi-threading within a processor core.

The various pipelined stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destination(s) for results of the operation. In a "dispatch" stage, the decoded instruction is dispatched to an issue queue (ISQ) where instructions wait for data and an available execution unit. Next, an instruction in the issue queue is issued to an execution unit in an "execution" stage. The "execution" stage processes the operation as specified by the instruction. Executing an operation specified by an instruction typically includes accepting data, e.g., one or more operands, and producing one or more results. There are usually register files associated with the execution units and/or the issue queue to hold data and/or information for the execution units. Register files typically have information read from and/or written to entries or locations in the register file.

SUMMARY

The summary of the disclosure is given to aid an understanding of a computer system, computer architectural structure, processor, register files, and method of using register files in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, register files, and/or their method of operation to achieve different effects.

In one or more embodiments, a method of processing data in a processor is disclosed. The method in an embodiment includes processing a parent stream; detecting a branch instruction in the parent stream; activating an additional child stream; setting a copy select vector of the child stream to be the same as the copy select vector of the parent stream; dispatching instructions for the parent stream and the additional child stream, and executing the parent stream and the additional child stream on different execution slices. In an aspect, the method further includes setting the copy select bits in the copy select vector for the child stream to equal the copy select bits in the copy select vector for the parent stream. A first parent mapper copy in an embodiment is associated and used in connection with executing the parent stream and a second different child mapper copy is associated and used in connection with executing the additional child stream. The method in an aspect further comprises determining the number of threads of execution that the processor is executing. An instruction fetch unit according to an embodiment detects a branch instruction and a signal is sent to the mapper to start a new stream.

The in an aspect the method further includes processing one or more threads of execution on one or more execution slices. In one or more embodiments, logical register entries in both copies of the mapper are looked up in parallel. The method further includes in an embodiment looking up the copy select bit for the dispatching stream and using the copy select bit to determine which mapper copy to utilize. In an aspect, the copy select vector is updated after a branch instruction for all younger instructions in the same dispatch group. In response to initial reads, in an embodiment, both streams will read the same mapper entries in the same mapper copy defined by the parent stream, and after initial reads, the copy select bit will select which mapper copy to read. In response to a write operation, in an aspect the method includes determining whether the copy select are the same bits for the logical register entry to be written for both streams, and in response to the copy select bits being the same, on a first write operation, write the other mapper copy and mark the mapper copy that was written as the mapper copy for that stream. The method in an embodiment, further comprises, in response to a write operation and determining whether the copy select are the same bits for the logical register entry to be written for both streams, and in response to the copy select bits being different, writing the mapper copy indicated by the copy select vector.

The method according to an embodiment further includes flushing one or more streams using a stream mask to identify the one or more streams to be flushed. In one or more embodiments, the method further includes ending a stream using a stream identification to identify which stream has ended.

In one or more embodiments, a system for processing data is disclosed. The system in an embodiment has at least one processor having at least one super slice; the at least one super slice having at least two execution slices for processing instructions, and a mapper having two mapper file copies, each mapper file copy having entries for storing data; each execution slice having at least one execution unit; one or more computer readable storage media; and programming instructions stored on the one or more computer readable storage media for execution by the at least one processor, where the programming instructions when executed by the processor cause the processor to: process a parent stream; detect a branch instruction in the parent stream; activate an additional child stream; set a copy select vector of the child stream to be the same as the copy select vector of the parent stream; dispatch instructions for the parent stream and the additional child stream, and execute the parent stream and additional child stream on different execution slices. In an embodiment, the programming instructions when executed by the processor cause the process to initialize the processor to process a child stream by setting the copy select bits in the copy select vector for the child stream to equal the copy select bits in the copy select vector of the parent stream. And in an aspect, the programming instructions when executed by the processor cause the processor to look up logical register entries in both copies of the mapper in parallel, and look-up the copy select bit for the dispatching stream and use the copy select bit of the dispatching stream to determine which mapper copy to utilize.

The processor in an embodiment is configured to operate in a number of modes of operation including single thread mode, double thread mode (SMT2) and four-threaded mode (SMT4) and the system further comprises programming instructions that when executed by the processor cause the processor to determine the mode in which the processor is operating. The processor in an aspect has four execution slices that can process four threads of instructions and the processor is further configured to process at least two streams of instructions.

According to an embodiment, a system for processing data is disclosed where the system has at least one processor having at least one super slice; the at least one super slice having at least two execution slices for processing instructions, each execution slice having at least one execution unit; at least one physical register file per super slice; at least one mapper per super slice for tracking associations between the physical register entries and logical register entries, each mapper having at least two mapper copies where each mapper copy has a plurality of entries for storing data and at least one mapper copy is associated with each execution slice, each mapper further having a copy select vector to select between the at least two mapper copies in each mapper to use when processing data, where the system is configured to execute multiple threads of execution and multiple streams of one or more threads of execution.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

BRIEF DESCRIPTION OF THE DRAWINGS

The various aspects, features, and embodiments of the computer system, computer architectural structure, processors, register files, and/or their method of operation will be better understood when read in conjunction with the figures provided. Embodiments are provided in the figures for the purpose of illustrating aspects, features, and/or various embodiments of the computer system, computer architectural structure, processors, register files, and their method of operation, but the claims should not be limited to the precise system, assembly, subassembly, arrangement, structures, features, aspects, embodiments, and/or devices shown, and the systems, assemblies, subassemblies, arrangements, structures, features, aspects, embodiments, methods, processes, and/or devices shown may be used singularly or in combination with other systems, assemblies, subassemblies, arrangements, structures, features, aspects, embodiments, methods and/or devices.

DETAILED DESCRIPTION

The following description is made for illustrating the general principles of the invention and is not meant to limit the inventive concepts claimed herein. In the following detailed description, numerous details are set forth in order to provide an understanding of the computer system, computer architectural structure, processor, register files, and their method of operation, however, it will be understood by those skilled in the art that different and numerous embodiments of the computer system, computer architectural structure, processor, register files, and their method of operation may be practiced without those specific details, and the claims and invention should not be limited to the system, assemblies, subassemblies, embodiments, features, processes, methods, aspects, and/or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified, and that the terms "comprises" and/or "comprising" specify the presence of stated features, integers, steps, operations, elements, and/or components, but do not preclude the presence or addition of one or more features, integers, steps, operations, elements, components, and/or groups thereof.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of registers. It may be noted that a numbered element is numbered according to the figure in which the element is introduced, and is typically referred to by that number throughout succeeding figures.

Figure 1:
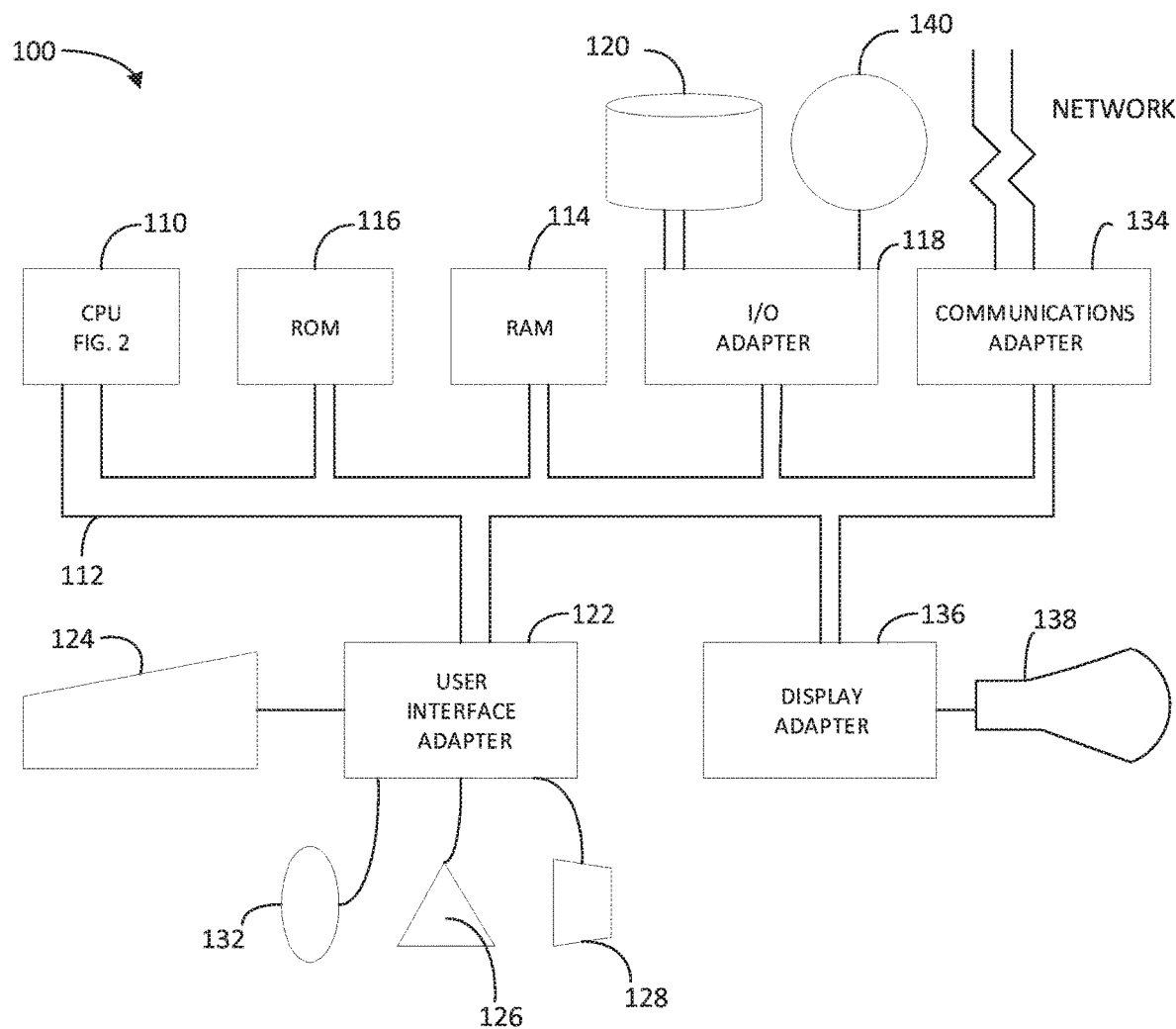
FIG. 1 illustrates an example of a data processing system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
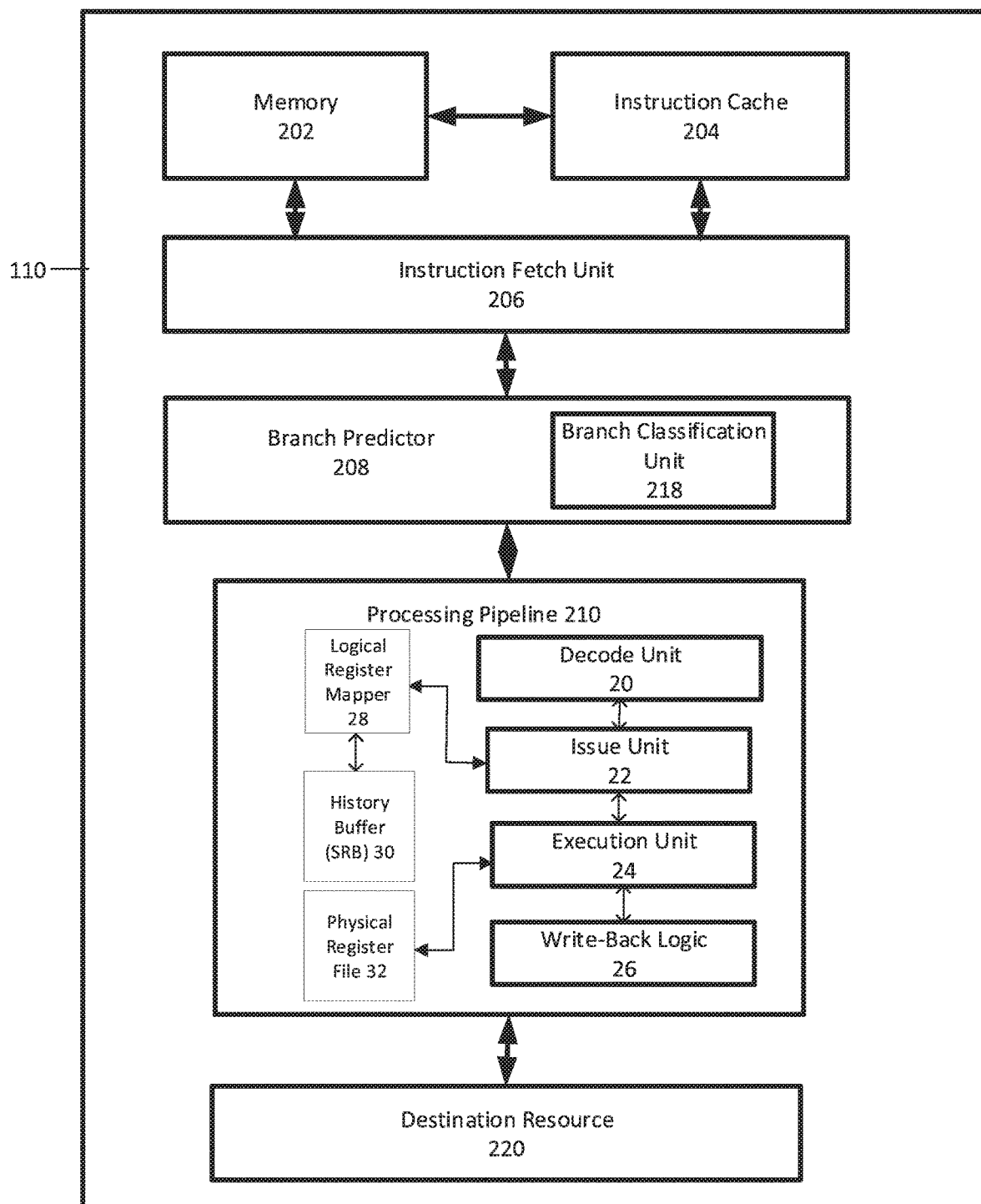
FIG. 2 illustrates a block diagram of a processor in which aspects of the present disclosure may be practiced.

FIG. 2 depicts a block diagram of a processor 110 according to an embodiment. The processor 110 includes memory 202, instruction cache 204, instruction fetch unit 206, branch predictor 208, branch classification unit 218, processing pipeline 210, and destination resource 220. The processor 110 may be included within a computer processor or otherwise distributed within a computer system. Instructions and data can be stored in memory 202, and the instruction cache 204 may access instructions in memory 202 and store the instructions to be fetched. The memory 202 may include any type of volatile or nonvolatile memory, such as cache memory. The memory 202 and instruction cache 204 can include multiple cache levels.

In FIG. 2, a simplified example of the instruction fetch unit 206 and the processing pipeline 210 are depicted. In various embodiments, the processor 110 may include multiple processing pipelines 210 and instruction fetch units 206. In an embodiment, the processing pipeline 210 includes a decode unit 20, an issue unit 22, an execution unit 24, write-back logic 26, a logical register mapper 28, a history buffer, e.g., Save & Restore Buffer (SRB) 30, and a physical register file 32. The instruction fetch unit 206 and/or the branch predictor 208 may also be part of the processing pipeline 210. The processing pipeline 210 may also include other features, such as error checking and handling logic, one or more parallel paths through the processing pipeline 210, and other features now or hereafter known in the art. While a forward path through the processor 110 is depicted in FIG. 2, other feedback and signaling paths may be included between elements of the processor 110. The processor 110 may include other circuits, functional units, and components.

The instruction fetch unit 206 fetches instructions from the instruction cache 204 according to an instruction address, for further processing by the decode unit 20. The decode unit 20 decodes instructions and passes the decoded instructions, portions of instructions, or other decoded data to the issue unit 22. The decode unit 20 may also detect branch instructions which were not predicted by branch predictor 208. The issue unit 22 analyzes the instructions or other data and transmits the decoded instructions, portions of instructions, or other data to one or more execution units 24 in the pipeline 210 based on the analysis. The physical register file 32 holds data for the execution units 24. The execution unit 24 performs and executes operations specified by the instructions issued to the execution unit 24. The execution unit 24 may include a plurality of execution units, such as fixed-point execution units, floating-point execution units, load/store execution units, vector scaler execution units, and/or other execution units. The logical register mapper 28 contains entries that provide a mapping between a logical register entry (LReg) and an entry in the physical register file 32. When an instruction wants to read a logical register entry (LReg), the logical register mapper 28 informs the issue unit 22, which informs the execution unit 24 where the data in the physical register file 32 can be located.

When a mispredicted branch instruction or other exception is detected, instructions and data subsequent to the mispredicted branch or exception are discarded, e.g., flushed from the various units of processor 110. A history buffer, e.g., Save & Restore Buffer (SRB) 30, contains both speculative and architected register states and backs up the logical register file data when a new instruction is dispatched. In this regard, the history buffer 30 stores information from the logical register mapper 28 when a new instruction evicts data in case the new instruction is flushed and the old data needs to be recovered. The history buffer (SRB) 30 keeps the stored information until the new instruction completes. History buffer (SRB) 30 interfaces with the logical register mapper 28 in order to restore the contents of logical register entries from the history buffer (SRB) 30 to the logical register mapper 28, updating the pointers in the logical register mapper 28 so instructions know where to obtain the correct data, e.g., the processor is returned to the state that existed before the interruptible instruction, e.g., the branch instruction was mispredicted.

The write-back logic 26 writes results of executed instructions back to a destination resource 220. In one or more embodiments, the destination resource 220 may be any type of resource, including registers, cache memory, other memory, I/O circuitry to communicate with other devices, other processing circuits, or any other type of destination for executed instructions or data. One or more of the processor pipeline units may also provide information regarding the execution of conditional branch instructions to the branch predictor 208.

Instructions may be processed in the processor 110 in a sequence of logical, pipelined stages. However, it should be understood that the functions of these stages may be merged together so that this particular division of stages should not be taken as a limitation, unless such a limitation is clearly indicated in the claims herein. Indeed, some of the stages are indicated as a single logic unit in FIG. 2 for the sake of simplicity of understanding, and further detail as relevant will be provided below.

Figure 3:
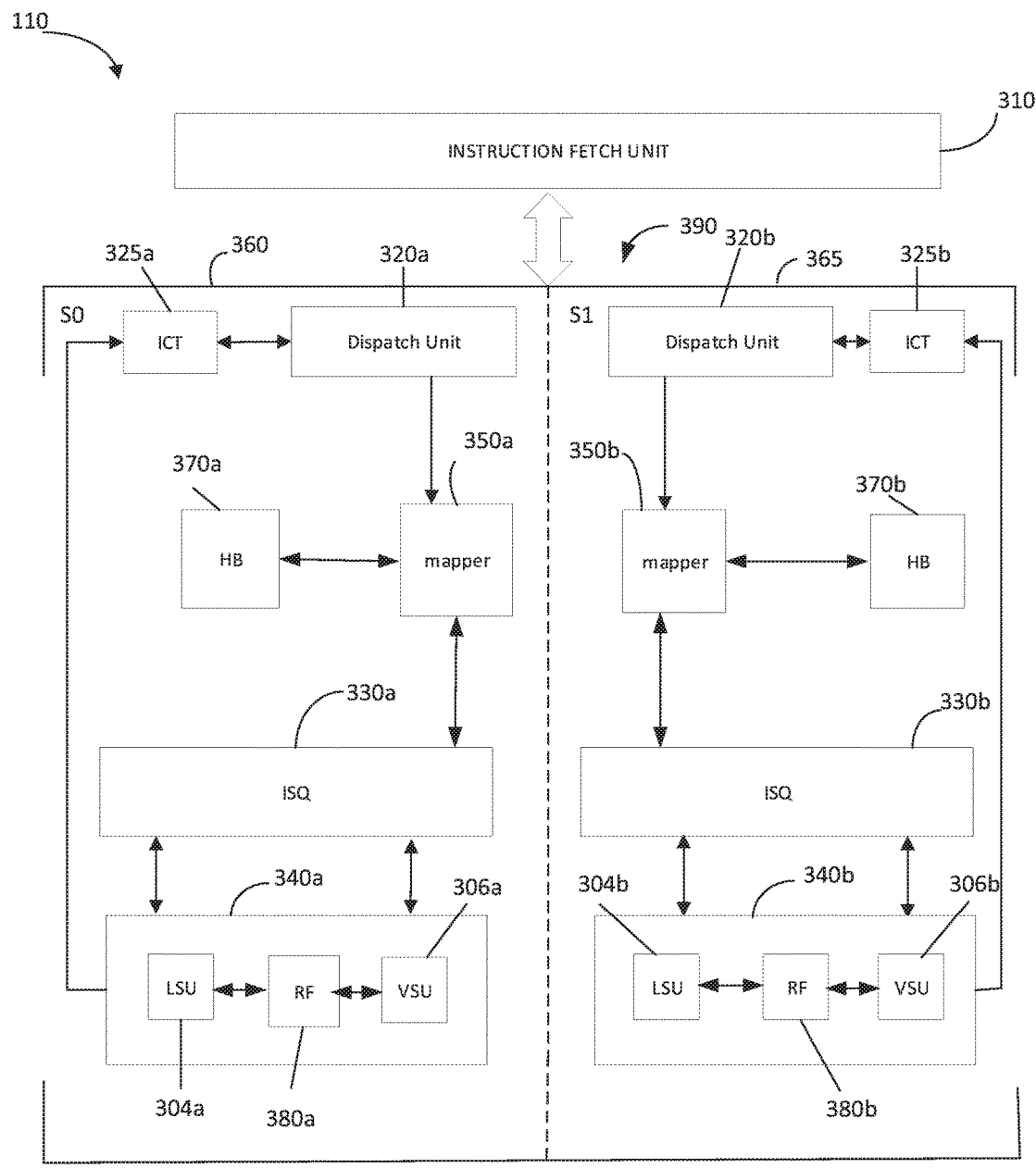
FIG. 3 illustrates a block diagram of a portion of a multi-slice processor in accordance with certain aspects of the present disclosure.

FIG. 3 illustrates a block diagram of a portion of a processor 110, and in this example a multi-slice processor 110 in accordance with an embodiment of the disclosure. It may be noted that FIG. 3 only shows portions of the multi-slice processor 110 in diagrammatic fashion for purpose of discussion. It will be appreciated that the multi-slice processor may have other configurations. As shown in FIG. 3, the multi-slice processor includes two processing slices-Slice 0 (slice S0 or 360) and Slice 1 (slice S1 or 365). The processor includes an Instruction Fetch unit 310. Each of the slices S0 and S1 includes an Instruction Dispatch Unit (320a and 320b); an Issue Queue (ISQ) (330a and 330b); Instruction Completion Table (ICT) (325a and 325b); Execution Units (340a and 340b) that include a load store unit (LSU) (304a and 304b), a vector scalar unit (VSU) (306a and 306b), and a Register File (RF) (380a and 380b); a History Buffer (HB) (370a and 370b); and a Logical Register Mapper (350a and 350b). The Execution Unit 340 may include one or more queues to hold instructions for execution by the Execution Unit 340.

It may be noted that the two slices are shown for ease of illustration and discussion only, and that multi-slice processor 110 may include more than two processing or execution slices with each slice having all the components discussed above for each of the slices S0 and S1 (slices 360 and 365). Further, the processing slices may be grouped into super slices (SS 390), with each super slice including a pair of processing slices. For example, a multi-slice processor may include two super slices SS0 and SS1, with SS0 including slices S0 and S1, and SS1 (not shown) including slices S2 and S3.

The Instruction Fetch Unit 310 fetches instructions to be executed by the processor 110 or processor slice. Instructions that are fetched by the Instruction Fetch Unit 310 are sent to the Instruction Dispatch Unit 320. The Instruction Dispatch Unit 320 dispatches instructions to the Issue Queue (ISQ) 330, typically in program order. The Issue Queue (ISQ) 330 will issue instructions to the Execution Unit 340. The ISQ 330 typically holds an instruction until data associated with the instruction has been retrieved and ready for use. A physical register file 380 may serve to store data to be used in an operation specified in an instruction dispatched to an execution unit 340, and the result of the operation performed by the Execution Units 340 may be written to the designated target register entry in the physical register file 380.

In certain aspects, the ISQ 330 holds a set of instructions and the register file 380 accumulates data for the instruction inputs. A register file may be used for staging data between memory and other functional (execution) units in the processor. There may be numerous register files and types. When all source data accumulates for the instruction, the data is passed on to one or more execution units designated for execution of the instruction. Each of the LSUs 304 and VSUs 306 may make result data available on the write back buses for writing into a register file (RF) entry.

When data is not ready, e.g., not within the appropriate data cache or register, delay can result as the ISQ 330 will not issue the instruction to the Execution Unit 340. For at least this reason, the Issue Queue (ISQ) typically issues instructions to the Execution Units 340 out of order so instructions where the required data is available can be executed. Dispatch Unit 320 in one or more embodiments will stamp each instruction dispatched to the Issue Queue 330 with an identifier, e.g., instruction tag (itag), to identify the instruction. The Dispatch Unit 320 may stamp instructions with other information and meta data. The instructions (itags) typically are allocated (assigned) and stamped in ascending program order on a per thread basis by the Dispatch Unit 320. Dispatch Unit 320 may also maintain a per thread instruction counter that increments for each instruction in a thread that is dispatched to the Issue Queue 330.

Logical register mapper 350 contains meta data (e.g., itag, RFtag, etc.) which provides a mapping between entries in the logical register (e.g., GPR1) and entries in physical register file 380 (e.g., physical register array entry). The RFtag is the pointer that correlates a logical register entry to a physical register file entry. For example, when an instruction wants to read a logical register, e.g., GPR1, the logical register mapper 350 tells issue queue 330, which tells execution unit 340 where in the physical register file 380 it can find the data, e.g., the physical register array entry.

The Execution Unit 340 executes instructions out-of-order and when the Execution Unit 340 finishes an instruction, the Execution Unit 340 will send the finished instruction, e.g., itag, to the ICT 325. The ICT 325 contains a queue of the instructions dispatched by the Dispatch Unit 320 and tracks the progress of the instructions as they are processed. In an embodiment, the ICT 325 has a completion tail pointer that keeps track of the progress of executing instructions in the thread, e.g., points to the next to complete instruction. In an embodiment, the instruction entry in the ICT will not identify the instruction as complete until all older instructions in the thread are completed.

History buffer (SRB) 370 contains logical register entries the logical register mapper 350 evicts from the logical register mapper 350 by younger instructions. The information stored in the history buffer (SRB) 370 may include the itag of the instruction that evicted the logical register entry (i.e., the evictor itag) from the logical register. History buffer (SRB) 370, in an embodiment, stores itag, logical register entry number (the bit field that identifies the logical register entry (LReg)), and Register File tag (RFTag) information. The RFTag is a pointer that correlates an entry in a logical register to an entry in the Physical Register File 380. History buffer (SRB) 370 may store and track other information. History buffer (SRB) 370 has an interface to the logical register mapper 350 to recover the itag, and register file tag (RFTag) (and other meta data) for each evicted logical register entry (LReg). The information is kept in the history buffer (SRB) 370 in a history buffer (SRB) entry until the new instruction (evictor instruction) is completed. At which point there is no reason to keep the old entry in the history buffer, e.g., SRB 370, and the entry is removed from the history buffer, as there is no flush recovery that could cause the history buffer (SRB) entry to be recovered A CPU 110 having multiple processing slices may be capable of executing multiple instructions simultaneously, for example, one instruction in each processing slice simultaneously in one processing cycle. Such a CPU having multiple processing slices may be referred to as a multi-slice processor or a parallel-slice processor. Simultaneous processing in multiple slices may considerably increase processing speed of the multi-slice processor. In single-thread (ST) mode a single thread is processed, and in SMT mode, two threads (SMT2) or four threads (SMT4) are simultaneously processed.

In an aspect, each execution/processing slice may have its own register file as shown in FIG. 3. In another aspect, one register file may be allocated per super slice and shared by the processing slices of the super slice. In one aspect, one register file may be allocated to more than one super slice and shared by the processing slices of the super slices. For example, slices S0, S1, S2, and S3 may be allocated to share one register file. In an embodiment, the register file 380 may be partitioned or sliced into portions, blocks or banks, where each execution unit writes to a specific portion, block or bank of the register file 380. This is referred to as a slice-target register file (STF). In an embodiment, each execution slice may have two or more blocks or banks of register files, and may have one or more copies of the blocks or banks of register files from the other execution slices. In an embodiment, at dispatch time, a mapper will assign a block of the register file, preferably a STF block of the register file, to each execution unit. The RF entries in register file 380 may be indexed by a tag identifier assigned by the mapper. For a slice-target register file (STF), the mapper in an embodiment assigns a STF tag and the blocks of the STF register file are indexed by the STF tag.

At a branch instruction, it is desirable to continue execution down both paths to resolve the branch, and increase processor efficiency and performance as well as decrease processor latency. In an embodiment, at the branch instruction, two streams are created, e.g., a parent stream and a child stream, and in an aspect preferably with separate stream identifications. The processor, system, and/or method will fetch instructions, dispatch and execute instructions down both paths, preferably using different processing pipelines or execution slices to execute multiple paths in parallel, until the branch is resolved. At resolution of the branch, the branch that is the wrong path is terminated, and in an embodiment, the processor, system, and method continue executing down the correct path.

Disclosed is a processor, architectural system, and method for parallel execution of both paths of a branch instruction, including in an embodiment a low confidence branch. In one or more embodiments, the logical register mapper will maintain mapper states for multiple streams by utilizing logical register mapper copies that are used to support multi-thread processing. That is, in an embodiment, the processor will execute instructions down both paths of a branch, executing multiple streams of instructions in the same one or more threads.

In one or more embodiments, the logical register mapper contains multiple copies of the register state to support multi-threading (SMT). One or more of the unused mapper copies in one or more embodiments are configured to be used for streaming, e.g., parallel execution of branch instructions. In one or more embodiments, the instruction fetch unit is responsible for managing the start of streams and sending an indication or signal to start a new stream. The dispatch unit in one or more embodiments sends an instruction with a logical register destination and a stream identification (ID) to the logical register mapper. The logical register mapper in one or more embodiments receives the indication or signal and in an aspect is responsible for setting up the logical register mapper state to permit streaming to begin. A copy select vector in one or more aspects is used to determine which mapper copy each stream will read and write. This copy select vector in one or more embodiments allows streaming to be supported without needing to copy the state of one mapper to another mapper. Streaming in one or more embodiments is supported using existing hardware used to support multi-threading.

When the instruction fetch unit (IFU) identifies a branch instruction suitable for streaming, and in an aspect a low confidence branch instruction, the IFU will send an indication or signal to the Issue Queue (ISQ), also referred to as the issue unit, to start a new stream. A stream identification (ID) will be sent, preferably by the IFU, to identify which stream is being started, e.g., to identify the child stream, and another stream identification (ID) will be sent to identify the parent stream. At the beginning of a new stream, both streams start with the same initial state that is based upon the state of the parent stream. That is, at the start of a stream, the state of a copy select vector from the parent stream must be the same as the copy select vector for the child stream to allow both streams to read the same initial data without copying the mapper state to a mapper copy. To support this, the copy select bits for the child stream are set to match the copy select bits for the parent stream. This causes both streams to look at the same mapper entry on their initial reads.

In one or more embodiments, at the start of a stream, the copy select vector can be copied from the parent to child stream, or the system could keep both in stream copies in sync when not being used for streaming to avoid any copying. In one or more aspects, the state of the copy select vector does not change when there is no streaming, e.g., when only a single stream is active. As a result, copying the copy select vector from the parent stream to the child stream can happen at the end of streaming rather than before the start of streaming. Whenever a stream ends, the ending stream in an embodiment can copy the state of the continuing stream to its copy select vector. Since the copy select vector will not change until the next stream starts, streaming of the child stream will be ready to start immediately at the start of the new child stream. This allows the overhead of copying a stream to be hidden while no streaming is occurring rather than having to pause the start of a stream to wait for the copy select vector to copy.

After the branch instruction, instructions can be dispatched to both streams. The dispatch unit will send an instruction with a logical register entry and a stream ID to the mapper. The mapper will look up the logical register entry in both copies of the mapper in parallel while looking up the copy select bit for the logical register for the dispatching stream. The copy select bit will be used to select which output of the mapper copies should be used. That is, the copy select vector determines or selects which mapper copy to read or write. The copy select vector in an embodiment will be read/written by each dispatching instruction, and also, in an embodiment, receives restores from the history buffer (SRB) to support flushing within a stream. Table 1 below illustrates the copy select vector and the read actions performed when the various copy select bit values are present in the copy select vector.

TABLE 1

Copy Select Vector Bit Value Reads

| | Stream 0 Copy Sel. | Stream 1 Copy Sel. | Notes |
|---|---|---|---|
| GPR0 | 0 | 0 | Both streams read mapper Copy 0 |
| GPR1 | 1 | 0 | Stream 0 reads mapper copy 1 and stream 1 reads mapper copy 0 |
| GPR2 | 0 | 1 | Stream 0 reads mapper copy 0 and stream 1 reads mapper copy 1 |
| . | | | |
| . | | | |
| . | | | |
| VSR63 | 1 | 1 | Both streams read mapper copy 1 |

After the mapper state has been set up for both streams, dispatch can begin on both streams. For their initial reads, both streams will read the same mapper entries in the same mapper copies that were defined by the parent streams. However, in an aspect, when a stream needs to write a mapper entry, since the parent stream mapper state is stored in a single entry in a single mapper copy and both streams may need to access it, a stream cannot overwrite the single copy unless the other stream will no longer need to access it, e.g., the other stream has already overwritten the same entry. If a stream wants to write an entry that the other stream could potentially read, that stream instead will write the other copy of the mapper for that corresponding entry. This gives each stream their own mapper state to write, but also allows the streams to share the initial mapper state. The stream determines if the other stream may need to read the mapper entry by checking the copy select bits. If for a given register entry, e.g., GPR 0, both the parent stream (stream 0) and child stream (stream 1) are pointing to the same mapper copy, then on the first write by either stream, the other mapper copy will be written. For example, if for GPR0 both the parent stream (stream 0) and the child stream (stream 1) are pointing to mapper copy 0 and child stream (stream 1) wants to write GPR0, it will check the copy select bits for GPR0 and see that they are both 0. This signals that the parent stream (stream 0) may still need to read the mapper state in mapper copy 0 for GPR0 and it can't be overwritten. The child stream (stream 1) will then write mapper copy 1 and set its copy select bit to reflect mapper copy 1. After this, the copy select for GPR0 for the parent stream (stream 0) will still point to mapper copy 0, but the copy select bit for the child stream (stream 1) will point to mapper copy 1. Any future writes by parent stream (stream 0) and child stream (stream 1) will see that the two copy select bits for GPR0 are different and will then use the mapper copy based upon the copy select bits.

In an embodiment, on dispatch of write instructions, if the copy select bit for a specific logical register entry to be written is different for both streams, stream 0 and stream 1, then the mapper copy indicated by the copy select vector is written. So for example, if the copy select bit for GPR0 stream 0 is set to mapper copy 0 and the copy select bit for GPR0 stream 1 is set to mapper copy 1, then the stream will write to the stream in its copy select vector and not update the copy select vector. Table 2 below shows the four possible copy select states for an entry in the mapper. Assuming stream 0 wants to write the entry identified in Table 2, Table 2 shows the updated copy select bit after the write is performed.

TABLE 2

Undated Copy Select After a Write is Performed

| Before | | After | | |
|---|---|---|---|---|
| Stream 0 Copy Sel. | Stream 1 Copy Sel. | Stream 0 Copy Sel. | Stream 1 Copy Sel. | Description |
| 0 | 0 | 1 | 0 | Before the write both streams are pointing to the entry in mapper copy 0, so on a stream 0 write instruction, stream 0 writes mapper copy 1 to leave the value in mapper copy 0 for stream 1, while stream 1 will continue to point to unchanged mapper copy 0 |
| 0 | 1 | 0 | 1 | Each stream is pointing to a different mapper, therefore stream 0 can safely write to mapper copy 0 |
| 1 | 0 | 1 | 0 | Each stream is pointing to a different mapper, therefore stream 0 can safely write to mapper copy 1 |
| 1 | 1 | 0 | 1 | Both streams are pointing to the entry in mapper copy 1 before the write, so on a stream 0 write instruction, stream 0 writes mapper copy 0 to leave the value in mapper copy 1 for stream 1, and stream 1 will continue to point to unchanged mapper copy 1 |

In an embodiment, the dispatch unit can only send a single stream per cycle so any instructions in the branch group must be for the same parent stream. The mapper in one or more embodiments updates the copy select vector whenever streaming is active. In the dispatch group, however, there will be instructions before and after streaming begins. The branch that starts the streaming will have an indicator allowing the mapper to identify it and then begin updating the copy select vector for all the younger instructions in the same dispatch group. That is, the stream branch is marked in an embodiment allowing the mapper to update the copy select vector after the stream branch.

Figure 4A:
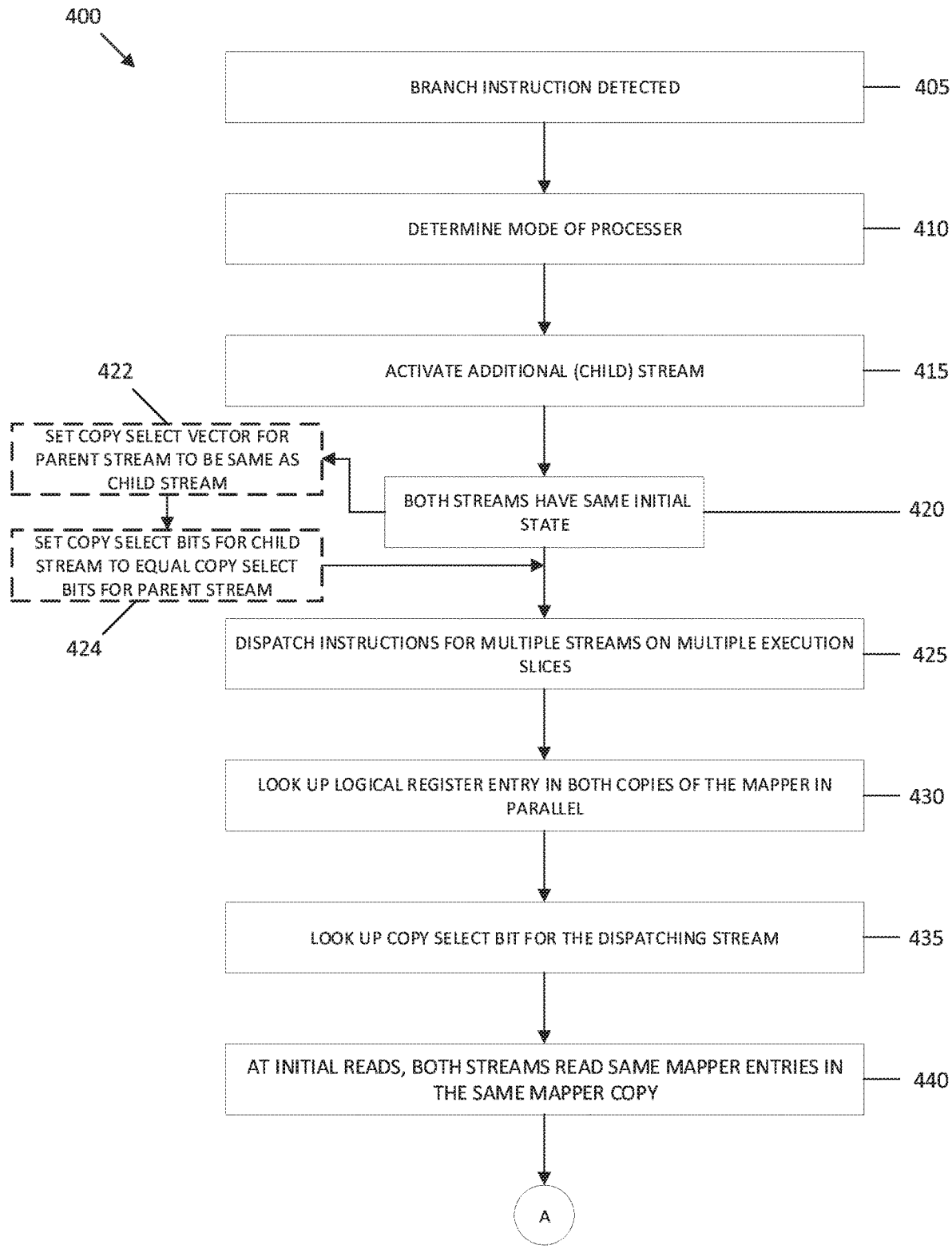
FIGS. 4A & 4B illustrates a flow diagram of a method according to an embodiment for processing data in a processor including a method of handling multiple streams of instructions in one or more threads in a processor.
Figure 4B:
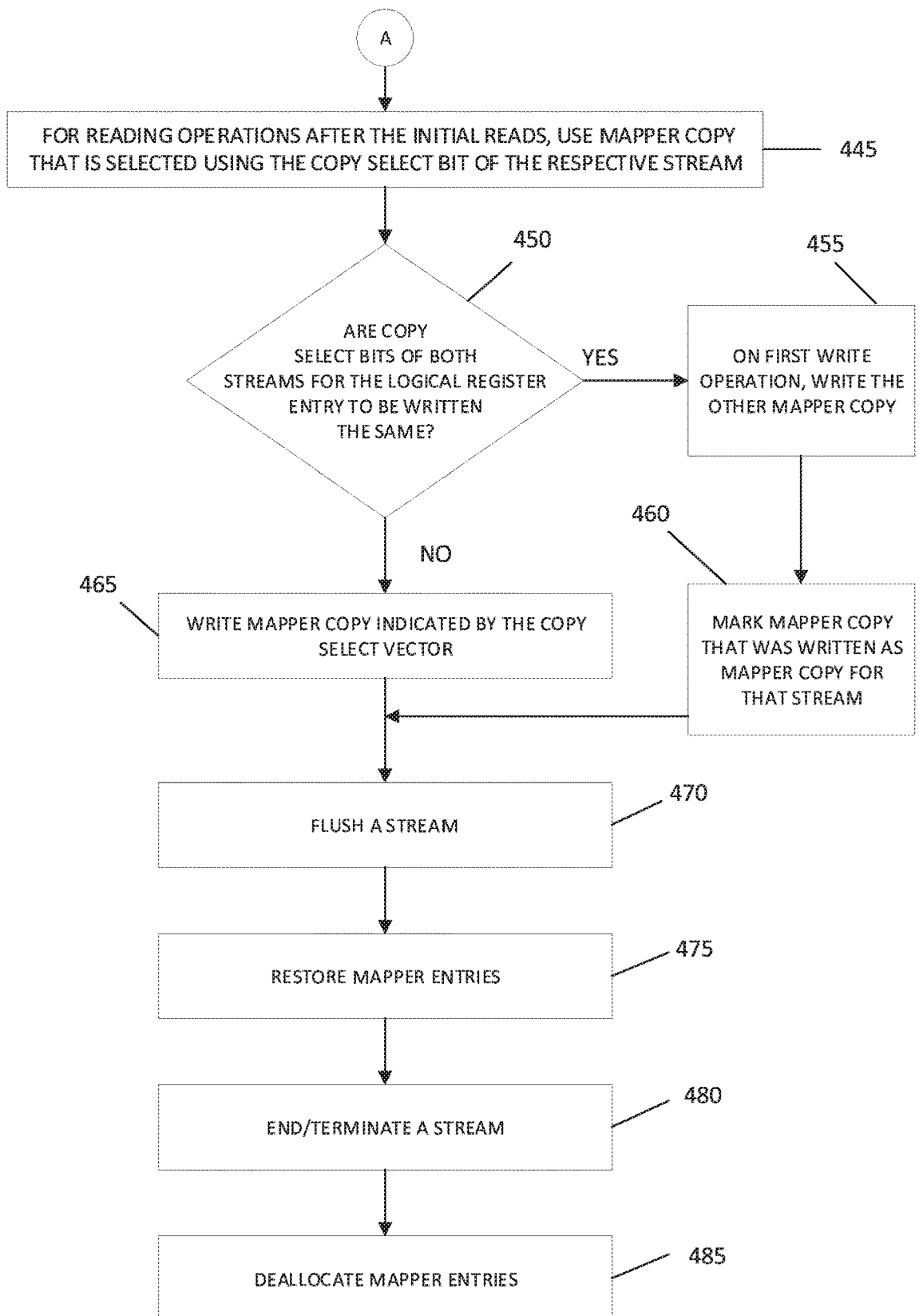

FIG. 4 is an exemplary flowchart in accordance with one embodiment illustrating and describing a method of handling instructions in an information handling system, and more specifically a method of parallel processing of branch instructions or multiple streams, in accordance with an embodiment of the present disclosure. While the method 400 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 4, but the process may be integrated and/or one or more steps may be performed together, simultaneously, or the steps may be performed in the order disclosed or in an alternate order.

The method 400 of processing instructions in a processor and preferably handling parallel execution of multiple streams of instructions is described in connection with the flow chart of FIG. 4. At 405 a branch instruction is detected, preferably in a multi-threaded processor that has multiple execution or processing slices. In an embodiment, the processor can be configured to parallel process one or more branches of the branch instruction simultaneously, and in one or more aspects is configured to process multiple branches of one or more low-confidence branches. In an embodiment, the IFU identifies a branch suitable for streaming, and preferably a low-confidence branch suitable for streaming, At 410, in one or more embodiments, the mode of the processor is detected to determine whether the processor has available resources or execution slices available to parallel process multiple branches, e.g., process multiple streams. In this regard, the number of threads the processor is executing is determined. For example, for a processor that handles four (4) threads per processor core, and can process in single-thread (ST) mode, two-thread mode (SMT2), or four-thread mode (SMT4), the processor in an aspect operates in single thread or two-threaded mode to process more than one stream at a time.

If the processor has the resources, at 415 an additional stream is activated. In one or more embodiments, an indication is sent to the issue unit (issue queue) to start a new stream. In an embodiment, the IFU sends the signal or identification to the issue queue to start a new stream. In an embodiment, a stream ID will be sent to identify which stream is being started (the child stream) and another stream ID to identify the parent stream. In one or more embodiments, the dispatch unit sends an instruction with a logical register entry and a stream ID to the mapper. At the beginning of a new stream, at 420, both streams start with the same initial state, which is preferably based upon the parent stream. In an aspect, the copy select vector for the parent stream at 422 is the same as the copy select vector for the child stream so that both streams read the same initial data. That is, to support the streams starting with same initial state, at 424, the copy select bits for the child stream are set to match the copy select bits for the parent stream. In an embodiment, this causes both streams to look at the same mapper entry on their initial reads.

At 425 the instructions for the different streams (parent and child streams) are dispatched and processed on different execution slices. In one or more embodiments, the instructions from one stream (e.g., the parent stream) are executed using the mapper, issue queue, execution units and register file of one execution slice and the instructions from a different stream (e.g., the child stream) are executed using the mapper, issue queue, execution units and register file from a different execution slice. In one or more embodiments, dispatch sends an instruction with a logical register entry and a stream ID. In one or more embodiments, at 430, the mapper receives an instruction with a logical register entry and a stream ID and will look up the logical register entry in both copies of the mapper in parallel. In addition, at 435, the copy select bit for the logical register entry for the dispatching stream is looked up and used to determine or select which output of the mapper copies to use.

In an embodiment, at 440, at their initial reads, both streams will read the same mapper entries in the same mapper copies that were defined by the parent streams. At 445, after the initial reads, the mapper copy that is utilized for reading operations is selected using the copy select bit according to the respective stream. When performing write operations, at 450, in one or more embodiments, the copy select bits for the logical register entry to be written are checked to see if they are the same. If the copy select bits are the same (450:Yes), e.g., both streams for that logical entry are pointing to the same mapper copy, then at 455 on the first write by either stream, the other mapper copy is written. In an aspect, at 460 the other mapper is thereafter marked or set as the mapper copy for the stream that was written. For example, if stream 0 wants to write a register entry, and the copy select bit for that register entry for stream 0 is mapper copy 0, then stream 0 will write mapper copy 1 for that register entry. In an aspect, the mapper copy 1 is set as the mapper for future operations for stream 0. At 465, if on the initial write operation, and for write operations after the initial write, the copy select bit for a specific logical register entry to be written is different for both streams (450:No), then the mapper copy indicated by the copy select vector is written.

In one or more embodiments, a stream may need to be flushed. At 470, in the appropriate circumstances, a stream is flushed. In one or more embodiments, a stream mask will be sent along with a flush iTag to facilitate the flush process. At 475, in an aspect, mapper entries are restored, preferably from the history buffer. In one or more embodiments, the history buffer has a stream ID per entry to determine which entry to restore. At the conclusion of one of the streams, e.g., because it was the wrong path, at 480 the stream that is concluded or finished is terminated, ended, or deactivated. In one or more embodiments, the mapper will receive, preferably from the IFU, an indication or signal that a stream has ended, preferably with a stream ID to identify the stream that has ended. In one or more embodiments, the register file tags, e.g., the STF tags, and the history buffer entries are deallocated at 485. The history buffer in one or more embodiments has a stream ID indicator per entry that is used to free register file tags and history buffer entries when the matching stream is ended. The mapper in an aspect relies on the history buffer to release register file (STF) tags. A stream end is treated differently by the history buffer compared to a flush since there is no restore of the marked entries.

Figure 5:
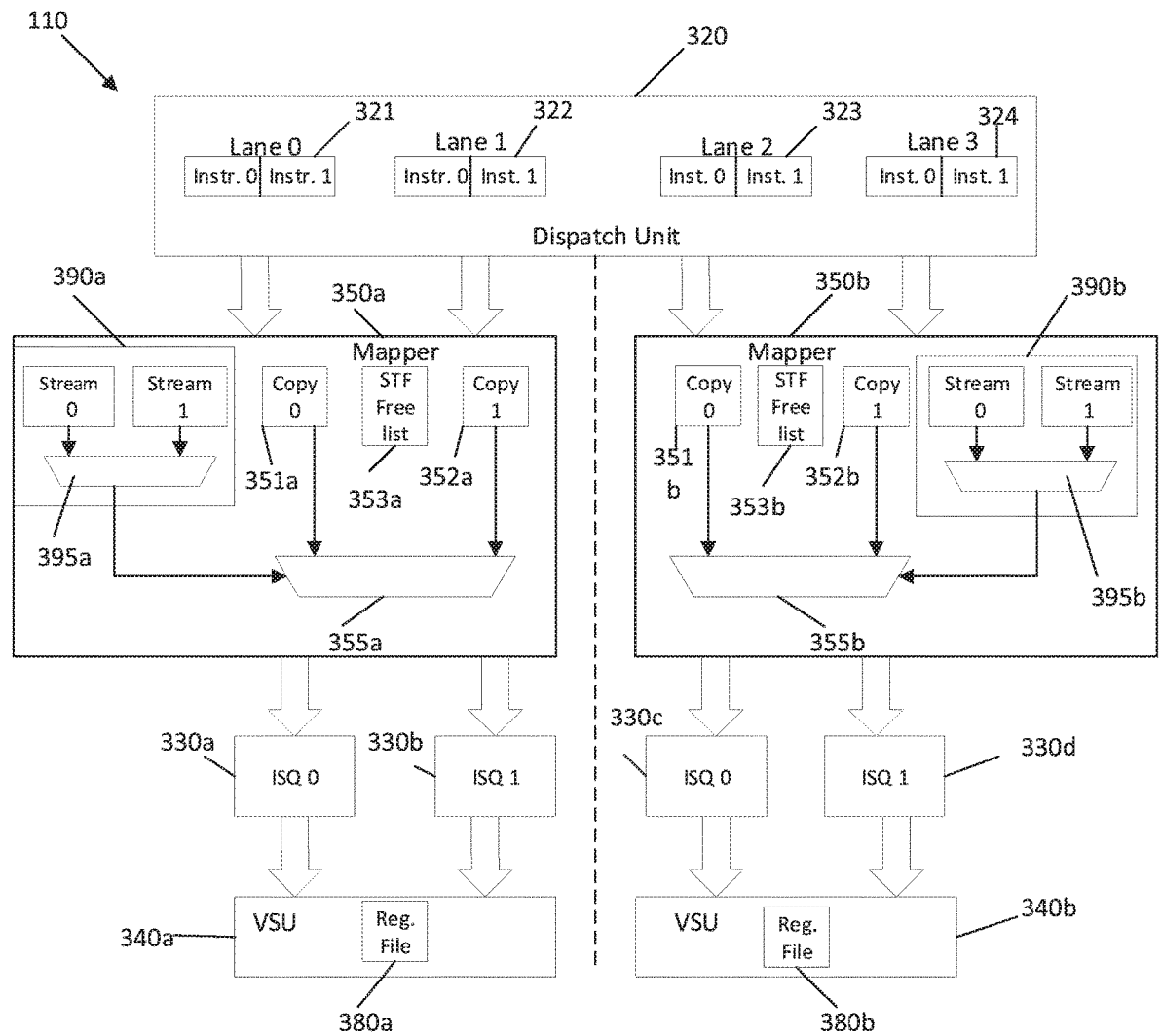
FIG. 5 illustrates a block diagram of a portion of a multi-slice processor configured for simultaneous multi-threading operation and for parallel processing of branch instructions according to an embodiment of the disclosure.

FIG. 5 illustrates a processor and system for handling multiple threads and/or multiple streams of instructions. The illustrative configuration and architecture of the processor as shown in FIG. 5 includes four execution slices configured as two super slices. The processor 110 includes a dispatch unit 320 that has a plurality of lanes (321, 322, 323, 324) for dispatching instructions. Each super slice of the processor preferably has a mapper 350 (350a and 350b) that includes two copies 351 and 352 of the logical register mapper (copy 0 and copy 1) and a register file free list 353. The register file free list 353 tracks the register file entries that are deallocated and free to be used. In the embodiment of FIG. 5, the register file 380 is a slice target register file (STF) and the mapper contains an STF free list 353. A STF slice target register is a register file that is sliced or partitioned into blocks or banks that are written to by designated execution units.

In an embodiment, the mappers 350 each include a multiplexor 355 (355a and 355b) to select which mapper copy to use. The processor, and in an embodiment, the mapper, includes a copy select vector 390 (390a and 390b), which also selects which mapper copy to use, e.g., to read/write. In an embodiment, the stream identification (ID) is used by the copy select vector to select which mapper copy to use. In an embodiment, a select multiplexor 395, preferably in the mapper 350 in the copy select vector 390, is used to select which of the mapper copy inputs to use, and the select line for the select multiplexor 395 is the stream identification. The processor 110 further includes two issue queues (330a and 330b for SS0 and 330c and 330d for SS1) per super slice to track and hold the instructions for the different execution slices. The processor of the illustrative embodiment of FIG. 5 also includes one or more VSU execution units (340a and 340b) per super slice that have one or more physical register files (380a and 380b) per super slice. Other execution units are contemplated in addition to or alternatively to the VSU execution unit(s).

In the processor of FIG. 5, the mapper 350 tracks the youngest version of each logical register entry (LREG) per thread. The mapper 350 reads source LREGs at dispatch, writes destination LREGs, and sends evicted mapper entries to the history buffer (Save and Restore Buffer (SRB)). Entries are restored to the mapper 350 from the history buffer (SRB) 370 at flush. The mapper 350 manages STF tags as the actual entries in the physical register file 380 are located in the VSU 340 as shown in FIG. 5. The mapper 350 uses the free list 353 to track available register entries and to manage the allocation and deallocation of register file tags, e.g., STF tags. In an embodiment of FIG. 5, each super slice has a different register file (STF) tag pool. Other configurations of the processor are contemplated and the disclosure is not limited to the embodiment of FIG. 5.

Figure 6:
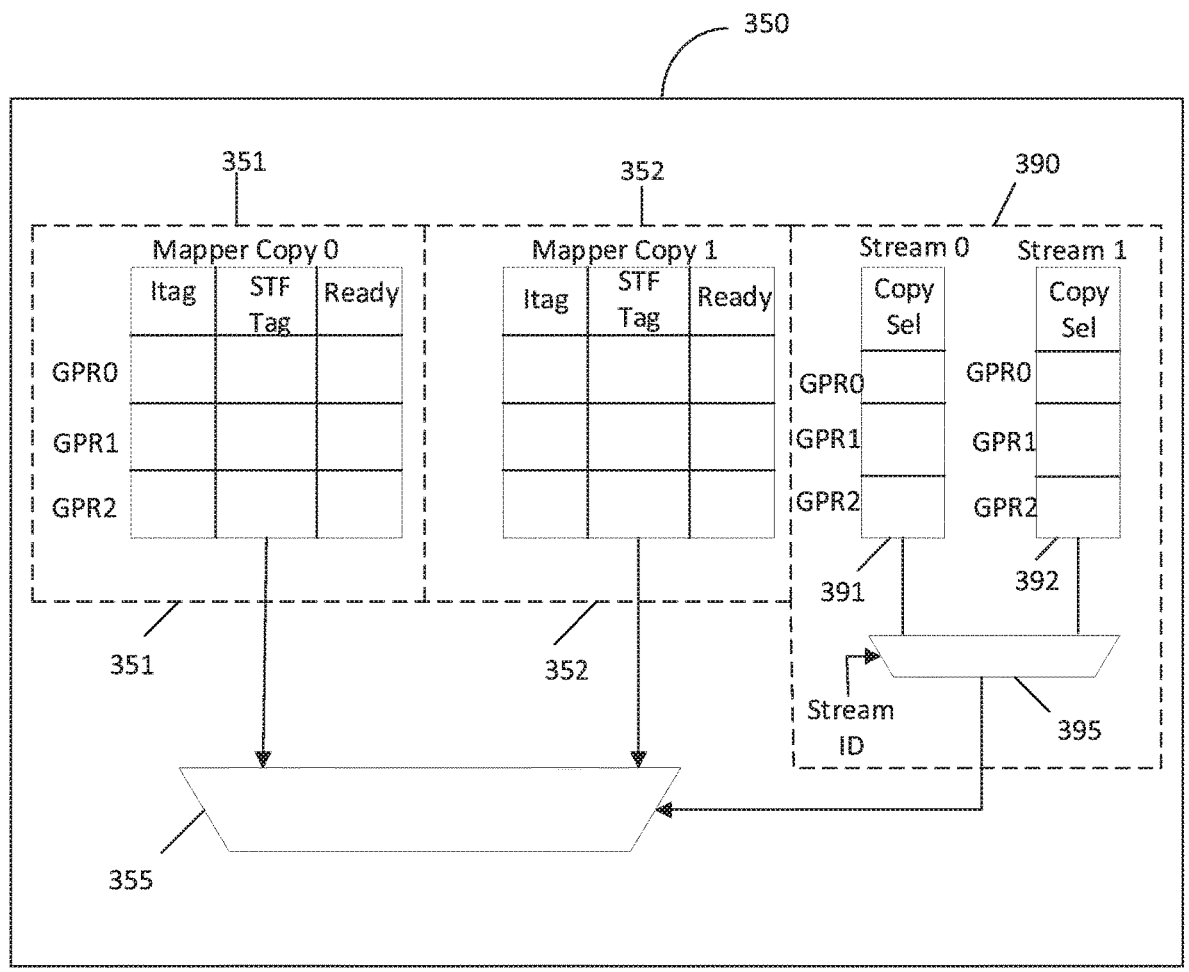
FIG. 6 illustrates a block diagram representing a logical register mapper in accordance with an embodiment of the disclosure.

FIG. 6 shows illustrative mapper 350 according to an embodiment of a processor that handles multi-threading and multi-streaming operations. The mapper 350 includes two mapper copies 351 and 352 and multiplexor 355 to select between the two mapper copies. In addition, mapper 350 includes copy select vector 390. Copy select vector 390 determines which mapper copy 351 or 352 should be read for each stream. There is a copy select bit for each logical register per stream as illustrated in columns 391 and 392 in FIG. 6. The copy select bit indicates which mapper copy the stream should read or write.

The copy select vector 390 includes select multiplexer 395 which is feed as its inputs a logical register entry copy select bit for each stream, e.g., for stream 0 and stream 1. Select multiplexer 395 also is fed the stream identification as the select line which choses which copy select bit to choose. The output of select multiplexer 395 is fed as the select line to multiplexor 355 to determine which mapper copy to select. At dispatch, the dispatch unit will send an instruction with a logical register entry and a stream identification (ID) to the mapper 350. The mapper 350 will look up the entry corresponding to the logical register in both copies 351 and 352 of the mapper in parallel while looking up the copy select bit in the copy select vector 390 for the logical register for the dispatching stream, e.g., using the stream identification. The copy select bit is used to select which output of the mapper copies should be used.

For illustrative purposes, the mapper copies 351 and 352 are shown as including the iTag, and the STF Tag for the STF register entry. The mapper entry field also can include a ready bit to indicate data has written back, or an instruction is ready to issue. The mapper entry field can include other bits as desired. There may be more or less mapper entry fields than shown in FIG. 6 and the fields may be different then the fields indicated in FIG. 6.

This disclosure is directed in one or more embodiments to a multi-threaded processor handling multi-streaming operations where the processor can execute multiple paths of a branch instruction, preferably a low-confidence branch. In one or more embodiments, depending upon which mode (single or multithreading) the processor is operating in, the mapper 350 has different thread assignments. For example, in an embodiment, when operating in single-thread (ST) mode, the single and only operating thread is assigned to mapper copy 0 in each super slice. In single-thread (ST) mode, in one or more embodiments, each mapper copy 0 in each super slice is a mirror image of the mapper copy 0 in the other slice, and mapper copy 1 in each super slice can be disabled. In single-thread (ST) mode, the mapper 350 has three additional mapper copies that are available to use for processing additional streams in the single thread.

In two-threaded mode (SMT2), in an embodiment the processor is configured, and can have logic and programming, so that the first thread (T0) is processed in mapper copy 0 in each super slice and the second thread (T2) is processed in mapper copy 1 of each super slice. There are two additional mapper copies that are available to use for processing additional streams in two-threaded (SMT2) mode. In the embodiment of FIG. 5, in an aspect, the processor is configured, and can have logic and programming, so that there are no additional mapper copies available to process additional streams if the processor is operating in four-threaded mode (SMT4). Table 3 below illustrates the mapper thread assignments according to an embodiment and uses bolding to indicate the additional mappers available to use for processing additional streams without using additional processing hardware not already configured as part of the multi-threaded processor configured to process up to four (4) threads simultaneously.

TABLE 3

Mapper Thread Assignments:

| Mode | SS0, Mapper Copy 0 | SS0, Mapper Copy 1 | SS1, Mapper Copy 0 | SS1, Mapper Copy 1 |
|---|---|---|---|---|
| ST | Thread 0 | | Thread 0 | |
| SMT2 | Thread 0 | Thread 2 | Thread 0 | Thread 2 |
| SMT4 | Thread 0 | Thread 2 | Thread 1 | Thread 3 |

Figure 7:
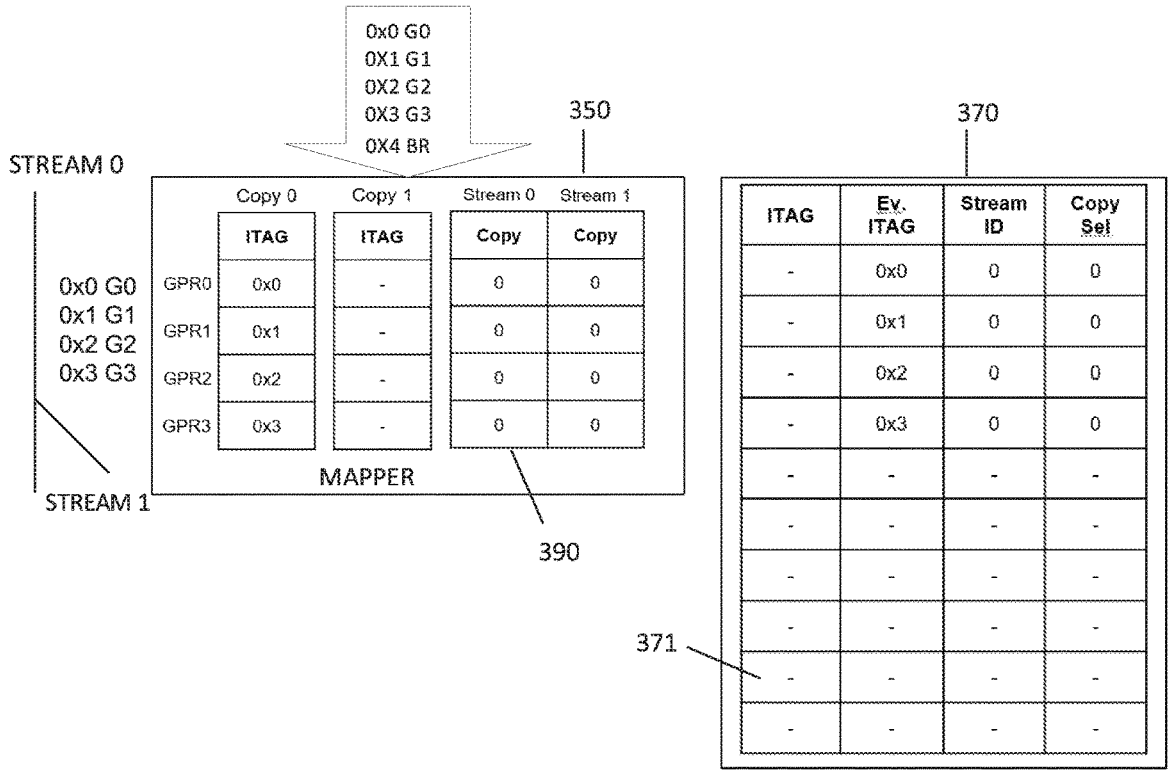
FIG. 7 illustrates a block diagram of a portion of a multi-slice processor operating in single thread mode and parallel processing two streams of the same thread of instructions according to an embodiment of the disclosure.
Figure 8:
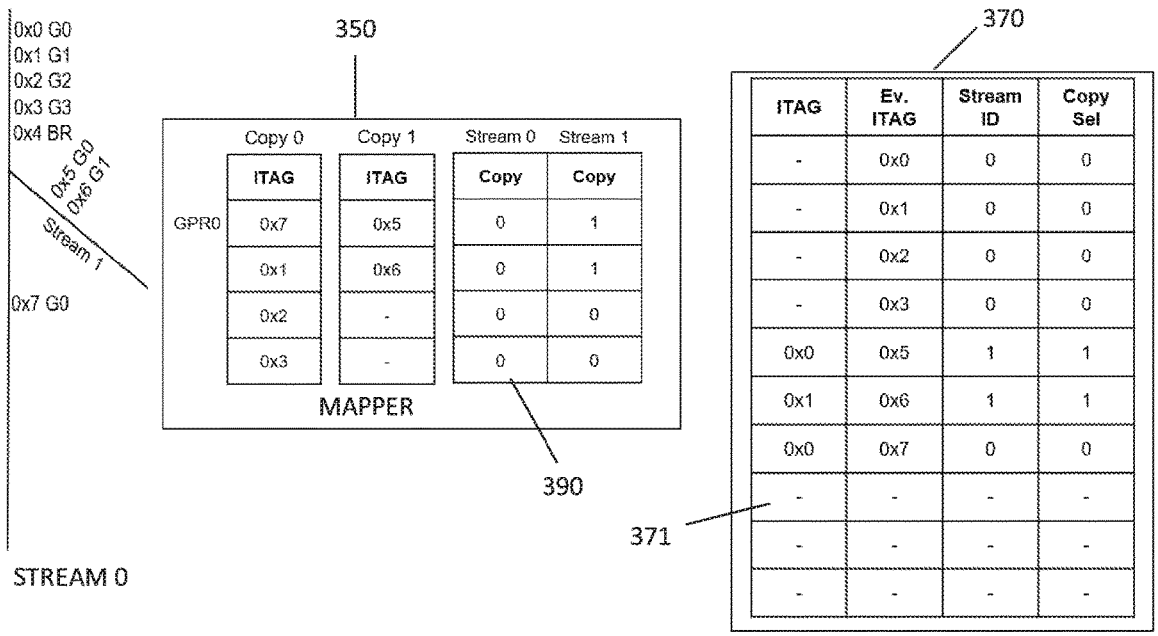
FIG. 8 illustrates a block diagram of a portion of a multi-slice processor operating in single thread mode and processing two streams of a thread of instructions according to an embodiment of the disclosure.
Figure 9:
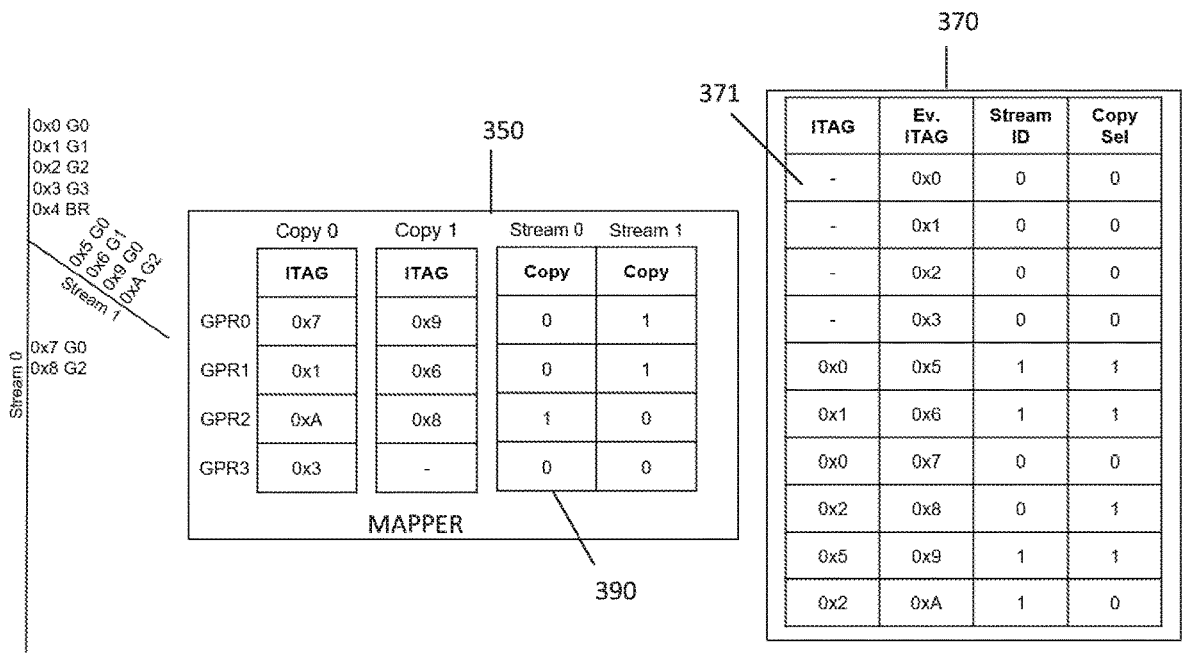
FIG. 9 illustrates a block diagram of a portion of a multi-slice processor operating in single thread mode and processing two streams of a thread of instructions according to an embodiment of the disclosure.

An example of a processor operating in single-thread (ST) mode and encountering a branch instruction and thereafter operating to process both paths of the branch instruction ill be discussed in connection with the multi-threaded processor of FIGS. 5 and 6. FIGS. 7-9 illustrate logical register mapper 350 and history buffer 370 and will be utilized to illustrate an example of processing one or more streams in a processor using a copy select vector 390. Logical register mapper 350 has copy 0 and copy 1 of mapper entries and copy select vector 390. History buffer (SRB) 370 for each entry 371 includes iTag, the evicted iTag, the stream ID, and Copy select bit for each entry evicted from the mapper 350.

In an embodiment, in a processor operating in single-thread (ST) mode, the processor begins in single-thread mode (ST) with only a single stream active, e.g., copy 0 of the mapper active. Instructions are dispatched on stream 0 and populate the mapper (e.g., mapper copy 0) and the physical registers. When a branch instruction is encountered, the processor, if operating in single-thread mode (ST) or two-thread mode (SMT2), can process both paths of the branch instruction simultaneously, e.g., in parallel. In an embodiment, the instruction fetch unit (IFU) sends a signal activating child stream 1 to be processed separate from parent stream 0. In an embodiment, the IFU sends a signal to the Issue Queue (ISQ) signaling the start of a new stream. In one or more embodiments, the IFU sends the stream ID of the newly created child stream and the stream ID of the parent stream to the Issue Queue (ISQ).

In the example of FIG. 7 there were four instructions (0x0, 0x1, 0x2, 0x3) before the branch instruction 0x4 BR which starts child stream 1 separate from parent stream 0. All instructions (0x0, 0x1, 0x2, 0x3) before the branch instruction are processed using mapper copy 0, as illustrated by mapper 350 and history buffer 390 in FIG. 7. On branch instruction 0x4 the stream branch indicator is set to 1 but the copy select vector 390 is not updated. FIG. 8 illustrates the mapper 350 and history buffer 370 after instructions 0x5 and 0x6 on child stream, followed by instruction 0x7 on stream 0. The copy select vector is updated after instructions 0x5, 0x6, and 0x7, and instruction 0x5 evicts instruction 0x0, instruction 0x6 evicts instruction 0x1, and instruction 0x7 evicts instruction 0x0 from mapper 350 as shown in FIG. 8. FIG. 9 illustrates the mapper 350 and history buffer 370 after instruction 0x8 G2 in stream 0, instruction 0x9 G0 in stream 1, and instruction 0xA G2 in stream 1 are dispatched. In each instance, the entries from both mapper copies are look up simultaneously and the copy select vector is used to determine which mapper copy is utilized. The copy select vector is updated after each instruction is executed since there are multiple streams being processed, e.g., there are one or more branch instructions being simultaneously processed.

Flush and restore within a stream is also supported by the processor. This permits a flush to occur on a speculative stream, restore and then continue executing while waiting for the branch resolution to determine the correct stream path. After streaming begins iTags are only in age order within the same stream, not each stream relative to the other, so the flush iTag is not enough. It's possible that a flush on the parent stream could flush an entire child stream if the branch that spawned the child stream was also flushed. The mapper, however, cannot determine this scenario and will treat it as a normal flush and rely on an additional indicator from the IFU that a stream has ended. To support flush and restore operations, a stream mask will be sent along with the flush iTag. The stream mask selects the stream to which a flush applies. The flush iTag is used as normal to identify and select which iTags of the stream to flush. The stream mask is needed because a flush may apply to both streams or only one stream and the processor needs to differentiate between the streams.

The stream mask may include a bit field to identify the stream to be flushed. For example, where the processor can operate in SMT4 mode (process four threads at a time), and can process two streams at a time, a two bit binary code may be utilized—one bit for each stream. An example of the two bit binary code can be "0bVX", where V represents stream 0, and X represents stream 1. In such an example 0b10 indicates stream 0 should be flushed.

Below is Table 4 showing an example of iTags for two streams where the stream iTags are not in age order relative to the other streams. In this example in Table 4, there is a flush on stream 1 for iTag 0x08. The stream mask in an aspect allows logic to know to only flush iTags younger than instruction 0x08 on stream 1 and to ignore the younger iTags on stream 0. The bolded iTags in Table 4 in stream 1 are flushed.

TABLE 4

| Flush on stream 1, stream mask = 0b01, Flush iTag 0x08 | |
| --- | --- |
| Stream 0 iTags | Stream 1 iTags |
| 0x00 | 0x02 |
| 0x01 | 0x03 |
| 0x04 | 0x08 |
| 0x05 | 0x09 |
| 0x06 | 0x0C |
| 0x07 | 0x0D |
| 0x0A | |

In the example show in Table 5, the flush is for iTag 0x04 with a stream mask for stream 0. Only the younger iTags on stream 0 are effected. The bolded iTags in stream 0 of Table 5 are flushed.

TABLE 5

| Flush on stream 0, stream mask = 0b10, Flush iTag 0x04 | |
| --- | --- |
| Stream 0 iTags | Stream 1 iTags |
| 0x00 | 0x02 |
| 0x01 | 0x03 |
| 0x04 | 0x08 |
| 0x05 | 0x09 |
| 0x06 | 0x0C |
| 0x07 | 0x0D |
| 0x0A | |

In the example of Table 6, iTag 0x01 is flushed with both streams selected by the stream mask. This causes both streams to flush away the bold iTags in Table 6 and would include the entire stream 1 so the mapper would expect an end stream indicator from the IFU.

TABLE 6

| Flush on streams 0 and 1, stream mask = 0b11, Flush iTag 0x01 | |
| --- | --- |
| Stream 0 iTags | Stream 1 iTags |
| 0x00 | 0x02 |
| 0x01 | 0x03 |
| 0x04 | 0x08 |
| 0x05 | 0x09 |
| 0x06 | 0x0C |
| 0x07 | 0x0D |
| 0x0A | |

Figure 10:
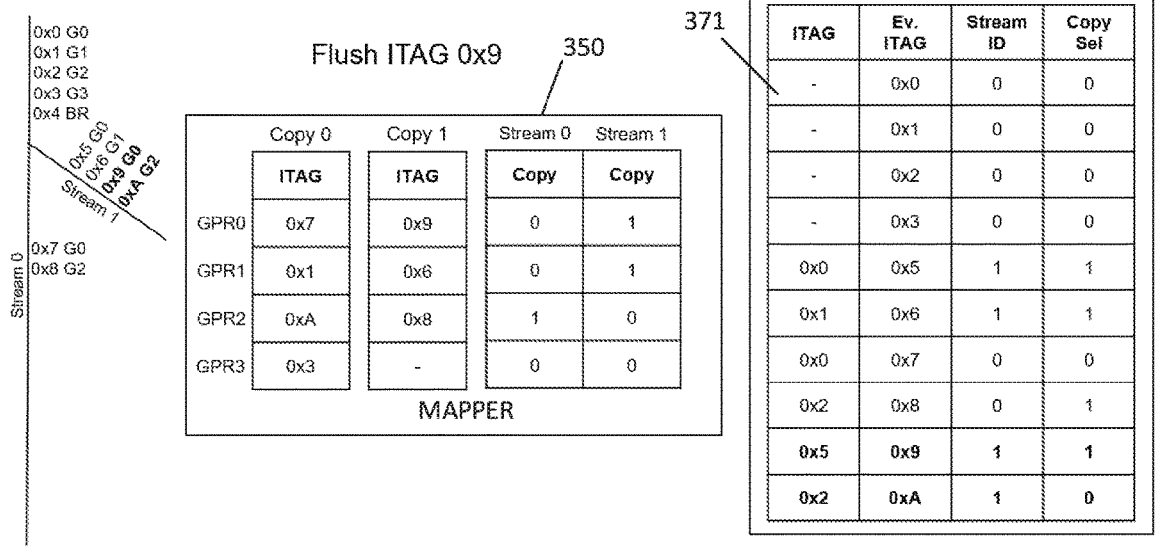
FIG. 10 illustrates a block diagram of a portion of a multi-slice processor operating in single thread mode and parallel processing two streams of the same thread of instructions according to an embodiment of the disclosure, where instructions in the child stream are being flushed.
Figure 11:
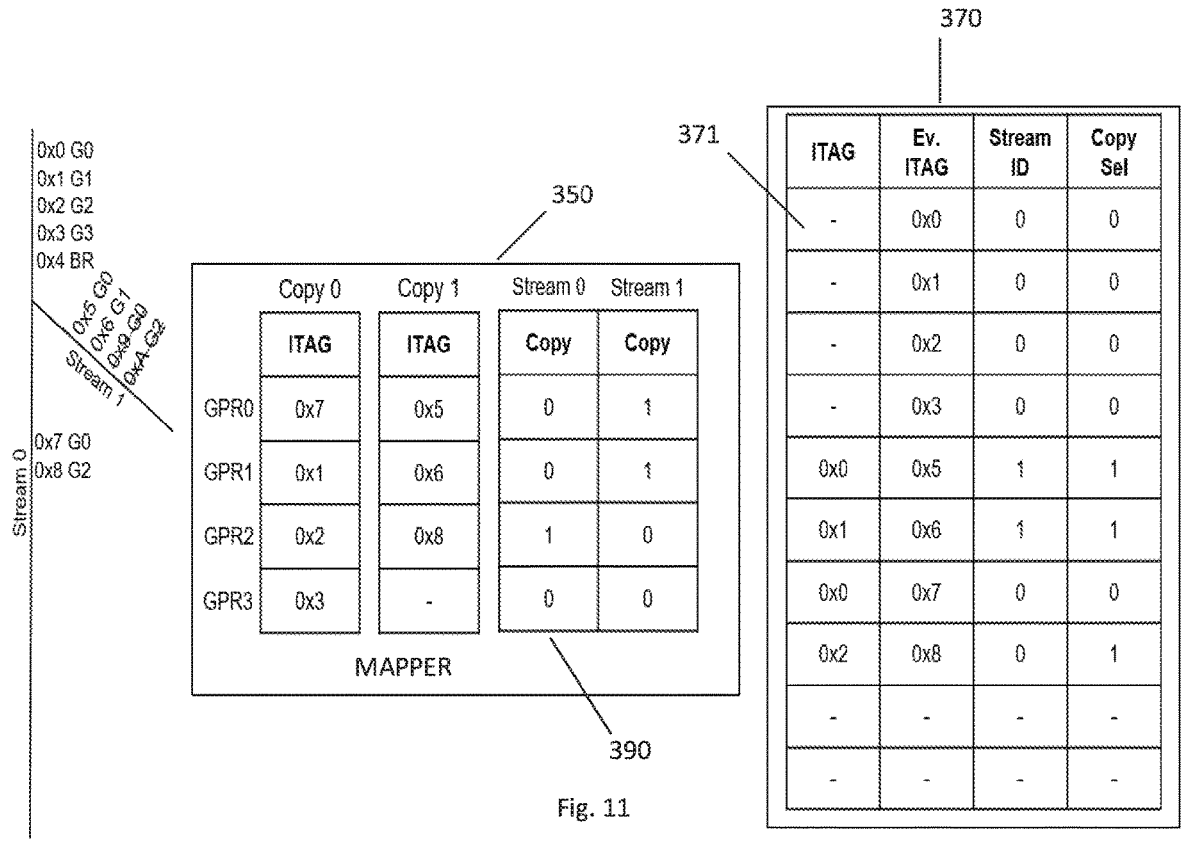
FIG. 11 illustrates a block diagram of a portion of a multi-slice processor operating in single thread mode and parallel processing two streams of the same thread of instructions according to an embodiment of the disclosure, where instructions in the child stream are being flushed and the mapper is being restored.

FIG. 10 illustrates a mapper 350 and history buffer 370 where instruction 0x9 from the processing of stream instructions from FIG. 9 in stream 1 will be flushed. In this illustrative example of FIG. 10, the flush iTag is 0x9 and the stream mask would be 0b01. The instructions in stream 1 after instruction 0x9, i.e., instruction 0xA in the example of FIG. 10, are also flushed. That is the bolded instructions in FIG. 10 will be flushed and the mapper will be restored as illustration in FIG. 11. That is the instruction 0xA in GPR2, copy 0 is replaced with instruction 0x2 and the instruction 0x9 in GPR0, copy 1 is replaced with instruction 0x5.

Figure 12:
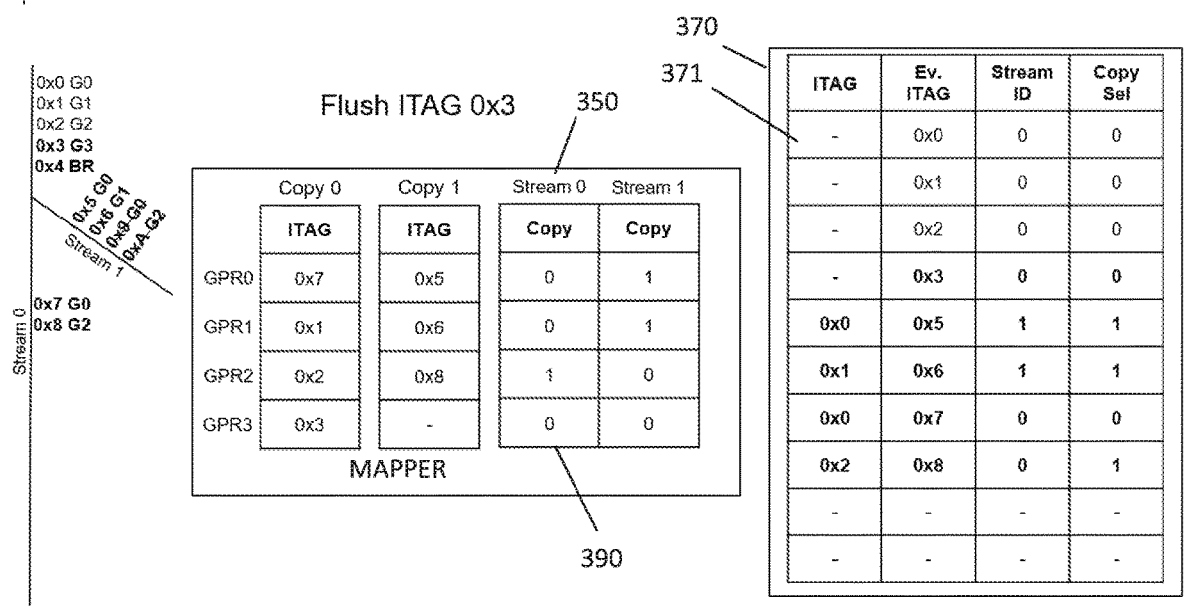
FIG. 12 illustrates a block diagram of a portion of a multi-slice processor operating in single thread mode and parallel processing two streams of the same thread of instructions according to an embodiment of the disclosure, where instructions in the parent stream are being flushed and the mapper is being restored.
Figure 13:
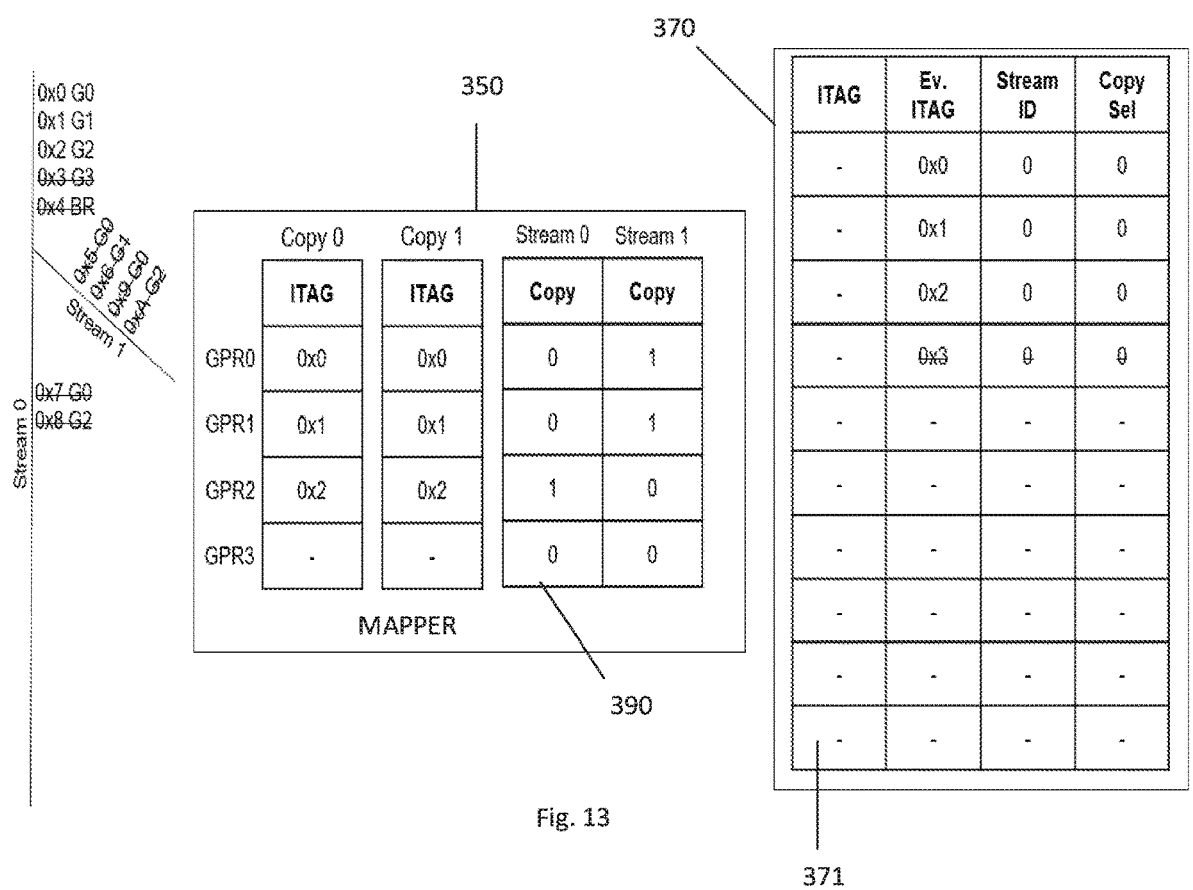
FIG. 13 illustrates a block diagram of a portion of a multi-slice processor operating in single thread mode and parallel processing two streams of the same thread of instructions according to an embodiment of the disclosure, where instructions in the parent stream are being flushed and the mapper is being restored.

If instructions 0x3 in the parent stream and those thereafter are flushed, then all the instructions in the history buffer earlier than (below) instruction 0x3 will be flushed and restored as illustrated by the bolded entries in FIG. 12. The state of the mapper is restored in reverse order by putting the processor and the mapper into the state that it was earlier. So in the mapper and history buffer from the earlier examples of FIGS. 7-12, instruction 0x8 GPR2 in copy 1 of the mapper is replaced with instruction 0x2, and instruction 0x7 GPR0 in mapper copy 0 is replaced by instruction 0x0, instruction 0x6 GPR1 in mapper copy 1 is replaced by instruction 0x1, instruction 0x5 GPR0 in mapper copy 1 is replaced by instruction 0x0, and instruction 0x3 in mapper copy 0 is flushed, but not replaced by any instruction so that the mapper and history buffer are in the state illustrated in FIG. 13.

The copy select bit is also sent to the history buffer (SRB) 370 along with other meta data such as iTag, evictor iTag, and stream identification (ID) when an entry is evicted from the mapper as shown in FIGS. 7-13. The history buffer (SRB) receives the flush iTag and flush stream mask to select which entries to restore. The history buffer (SRB) will have a stream ID per entry to determine which entries to restore. Entries from the history buffer (SRB) will be restored based on the state of the copy select vector. On restore, the copy select bit is used to select which copy of the mapper the restore should write. On restore, the mapper copy to be written will be selected based upon the restoring copy select bit value. The copy select bit value on a restore operation should match the copy select bit value after the write operation, not the current value of the copy select bit.

The actual copy select bit in the mapper is not updated based upon a restore. To have sent an entry from the mapper to the history buffer, the mapper entry must have been previously written. Therefore, the mapper entries for the two streams would already be assigned to different mapper copies. Both streams would not be looking at the same mapper copy entry. If the first write to an entry is flushed and restored, it will write its assigned mapper copy rather than reverting both streams to pointing to the same entry. This simplifies the restore logic and allows the copy select vector not to be updated based upon flush within a stream.

At branch resolution one of the streams is selected as the correct path based on the outcome of the branch. The incorrect stream is ended by the IFU while the correct stream can continue execution. The mapper will receive an indication from the IFU when a stream is ended along with a stream ID to identify which stream has ended. The mapper will also receive a stream ended indication if an entire stream is flushed. In an embodiment, the stream cannot be ended until the branch that spawned the stream has been completed, which insures that if the original parent stream is ended then resources allocated before the branch will not be cleared. In the example below in Table 7, stream 0 is the parent stream. A branch spawns a stream and the branch resolves to stream 1. Although this technically ends stream 0 there will still be instructions active for stream 0 up until the branch is completed.

TABLE 7

| Branch Resolution | | | |
|---|---|---|---|
| Stream 0 | | Stream 1 | |
| iTag | Instruction | iTag | Instruction |
| 0x00 | | | |
| 0x01 | | | |
| 0x02 | | | |
| 0x03 | BR | | |
| 0x04 | ADD | 0x06 | SUB |
| 0x05 | SUB | 0x07 | ADD |

TABLE 7-continued

| Branch Resolution | | | |
|---|---|---|---|
| Stream 0 | | Stream 1 | |
| iTag | Instruction | iTag | Instruction |
| 0x0A | LD | 0x08 | ST |
| 0x0B | ST | 0x09 | LD |

At the end of a stream, the resources assigned to a stream will need to be deallocated including the history buffer (SRB) entries and the register file tags, e.g., STF tags. The history buffer has a stream ID indicator per entry, which it can use to free the register file, e.g., STF tags, and history buffer entries when the matching stream is ended. There can be a case where a parent stream entry is evicted by a child stream at the beginning of a stream when both streams are reading the same mapper entry. The history buffer in an embodiment should only release register file (STF) tags based on the evictor stream ID. The mapper relies on the history buffer to release the register file (STF) tags at a stream end. A stream end is handled differently by the history buffer than a flush since there is no restore of the marked entries when a stream is ended. In one or more embodiments, a flush on the ending stream should be seen before the stream end so the history buffer may begin restoring the ending stream before the stream end indication, which would terminate the restore process. Table 8 below indicates the action taken under different scenarios based upon the evictee stream, the evictor stream, and the ending stream.

TABLE 8

| Stream Resource Deallocator | | | |
|---|---|---|---|
| Evictee Stream | Evictor Stream | Ending Stream | Action |
| 0 | 0 | 0 | Release Evictor mapper (STF) Tag |
| 0 | 0 | 1 | No action |
| 0 | 1 | 0 | No action |
| 0 | 1 | 1 | Release Evictor mapper (STF) Tag |
| 1 | 0 | 0 | Release Evictor mapper (STF) Tag |
| 1 | 0 | 1 | No action |
| 1 | 1 | 0 | No action |
| 1 | 1 | 1 | Release Evictor mapper (STF) Tag |

While the method of simultaneous streaming, also referred to as parallel processing or execution of both paths of a branch instruction, has been described with reference to a processor that is configured with four execution slices and for processing up to four threads at a time, the disclosure and teaching has application to other processor configurations, and can include parallel processing of multiple streams in SMT4 mode, as well as ST mode and SMT2 mode.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, circuitry, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, the method comprising:
   processing a parent stream;
   detecting a branch instruction in the parent stream;
   activating an additional child stream;
   setting a copy select vector of the child stream to be the same as the copy select vector of the parent stream;
   dispatching instructions for the parent stream and the additional child stream, and
   executing the parent stream and the additional child stream on different execution slices.

2. The method according to claim 1, further comprising setting the copy select bits in the copy select vector for the child stream to equal the copy select bits in the copy select vector for the parent stream.

3. The method according to claim 1, wherein a first parent mapper copy is associated and used in connection with executing the parent stream and a second different child mapper copy is associated and used in connection with executing the additional child stream.

4. The method according to claim 1, wherein an instruction fetch unit detects a branch instruction and a signal is sent to the mapper to start a new stream.

5. The method of claim 1, further comprising processing one or more threads of execution on one or more execution slices.

6. The method according to claim 1, further comprising determining the number of threads of execution that the processor is executing.

7. The method according to claim 1, further comprising looking up logical register entries in both copies of the mapper in parallel.

8. The method according to claim 7, further comprising looking up the copy select bit for the dispatching stream and using the copy select bit to determine which mapper copy to utilize.

9. The method of claim 1, further comprising updating the copy select vector after a branch instruction for all younger instructions in the same dispatch group.

10. The method of claim 1, further comprising in response to initial reads, both streams will read the same mapper entries in the same mapper copy defined by the parent stream, and after initial reads, the copy select bit will select which mapper copy to read.

11. The method of claim 1, further comprising, in response to a write operation, determining whether the copy select are the same bits for the logical register entry to be written for both streams, and in response to the copy select bits being the same, on a first write operation, write the other mapper copy and mark the mapper copy that was written as the mapper copy for that stream.

12. The method of claim 11, further comprising, in response to a write operation and determining whether the copy select are the same bits for the logical register entry to be written for both streams, and in response to the copy select bits being different, write the mapper copy indicated by the copy select vector.

13. The method according to claim 1, further comprising flushing one or more streams using a stream mask to identify the one or more streams to be flushed.

14. The method according to claim 1, further comprising ending a stream using a stream identification to identify which stream has ended.

15. The method of claim 1, wherein the processor has four execution slices that can process four threads of instructions and the processor is further configured to process at least two streams of instructions.

16. A system for processing data, the system comprising:
   at least one processor having at least one super slice;
   the at least one super slice having at least two execution slices for processing instructions, and a mapper having two mapper file copies, each mapper file copy having entries for storing data;
   each execution slice having at least one execution unit;
   one or more computer readable storage media; and
   programming instructions stored on the one or more computer readable storage media for execution by the at least one processor,
   wherein the programming instructions when executed by the processor cause the processor to:
   process a parent stream;
   detect a branch instruction in the parent stream;
   activate an additional child stream;

set a copy select vector of the child stream to be the same as the copy select vector of the parent stream;

dispatch instructions for the parent stream and the additional child stream, and execute the parent stream and additional child stream on different execution slices.

17. The system according to claim 16, wherein the processor is configured to operate in a number of modes of operation including single thread mode, double thread mode (SMT2) and four-threaded mode (SMT4) and the system further comprises programming instructions that when executed by the processor cause the processor to determine the mode in which the processor is operating.

18. The system according to claim 16, further comprising programming instructions that when executed by the processor cause the process to initialize the processor to process a child stream by setting the copy select bits in the copy select vector for the child stream to equal the copy select bits in the copy select vector of the parent stream.

19. The system according to claim 16, further comprising programming instructions that when executed by the processor cause the processor to look up logical register entries in both copies of the mapper in parallel, and look-up the copy select bit for the dispatching stream and use the copy select bit of the dispatching stream to determine which mapper copy to utilize.

20. A system for processing data, the system comprising:

at least one processor having at least one super slice;

the at least one super slice having at least two execution slices for processing instructions, each execution slice having at least one execution unit;

at least one physical register file per super slice;

at least one mapper per super slice for tracking associations between the physical register entries and logical register entries, each mapper having at least two mapper copies where each mapper copy has a plurality of entries for storing data and at least one mapper copy is associated with each execution slice, each mapper further having a copy select vector to select between the at least two mapper copies in each mapper to use when processing data, wherein the system is configured to execute multiple threads of execution and multiple streams of one or more threads of execution.

\* \* \* \* \*